(12) United States Patent
Harbs et al.

(10) Patent No.: US 11,571,004 B2
(45) Date of Patent: Feb. 7, 2023

(54) CONCHING DEVICE AND METHOD FOR CONCHING A PRODUCT MASS

(71) Applicant: NETZSCH-Feinmahltechnik GmbH, Selb (DE)

(72) Inventors: Theron Harbs, Selb (DE); Matthias Kapp, Weilersbach (DE); Sergio Devegili, Rio doe Cedros Pomerode/SC (BR)

(73) Assignee: NETZSCH-Feinmahltechnik GmbH, Selb (DE)

(*) Notice: Subject to any disclaimer, the term of this patent is extended or adjusted under 35 U.S.C. 154(b) by 745 days.

(21) Appl. No.: 16/488,332

(22) PCT Filed: Feb. 21, 2018

(86) PCT No.: PCT/DE2018/000045
§ 371 (c)(1),
(2) Date: Aug. 23, 2019

(87) PCT Pub. No.: WO2018/153392
PCT Pub. Date: Aug. 30, 2018

(65) Prior Publication Data
US 2019/0373910 A1    Dec. 12, 2019

(30) Foreign Application Priority Data
Feb. 24, 2017 (DE) .......................... 102017001784.0

(51) Int. Cl.
*A23G 1/12* (2006.01)
*A23G 1/00* (2006.01)
(Continued)

(52) U.S. Cl.
CPC .......... *A23G 1/125* (2013.01); *A23G 1/0043* (2013.01); *A23G 1/16* (2013.01); *A23G 7/0062* (2013.01)

(58) Field of Classification Search
CPC .... A23G 1/125; A23G 1/0043; A23G 1/0016; A23G 1/0036; A23G 7/0062
See application file for complete search history.

(56) References Cited

U.S. PATENT DOCUMENTS 5,450,786 A * 9/1995 Muntener ................. A23G 1/16
99/485
5,707,145 A * 1/1998 Lucke ................. B01F 27/0726
366/279
(Continued)

FOREIGN PATENT DOCUMENTS

DE    3603155 A1    8/1987
DE    4221315 A1    1/1994
(Continued)

OTHER PUBLICATIONS

International Preliminary Report on Patentability Application No. PCT/DE2018/000045 dated Aug. 27, 2019 12 pages.
(Continued)

*Primary Examiner* — Alison L Hindenlang
*Assistant Examiner* — Virak Nguon
(74) *Attorney, Agent, or Firm* — Whitmyer IP Group LLC (57) ABSTRACT

A conching apparatus having: a container, which forms an accommodating space for a product mass, a shaft, which is accommodated, at least in part, in the container and is designed to rotate about its longitudinal axis, and at least one conching tool, which is coupled to the shaft for joint rotation therewith, the conching tool therefore, during conching operation of the conching apparatus, moving in a first direction of circulation along a circulatory path. The conching tool here includes an operative surface, which is directed towards the inner wall of the container and is designed such that a radial gap between the inner wall of the container and the operative surface decreases, at least in part, counter to (Continued)

the first direction of circulation. The invention also relates to a method for conching a product mass.

20 Claims, 4 Drawing Sheets

(51) Int. Cl.
*A23G 1/16* (2006.01)
*A23G 7/00* (2006.01)

(56) References Cited

U.S. PATENT DOCUMENTS

| | | | | | |
|---|---|---|---|---|---|
| 5,945,150 | A | * | 8/1999 | Lipp | A23G 1/042 |
| | | | | | 426/631 |
| 6,129,008 | A | * | 10/2000 | Muntener | A23G 1/16 |
| | | | | | 366/147 |
| 2019/0201857 | A1 | * | 7/2019 | Lekner | B01F 35/95 |

FOREIGN PATENT DOCUMENTS

| | | | |
|---|---|---|---|
| DE | 4433039 | A1 | 3/1996 |
| DE | 19636989 | A1 | 4/1997 |
| DE | 19637098 | A1 | 3/1998 |
| DE | 19835347 | A1 | 2/2000 |
| EP | 3241449 | A1 * | 11/2017 ............... A23G 1/04 |
| GB | 2523271 | A | 8/2015 |

OTHER PUBLICATIONS

International Search Report and Translation Application No. PCT/DE2018/000045 Completed: Apr. 23, 2018; dated May 2, 2018 7 pages.

Written Opinion of the International Searching Authority Application No. PCT/DE2018/000045 Completed: Apr. 23, 2018; dated May 2, 2018 15 pages.

\* cited by examiner

CONCHING DEVICE AND METHOD FOR CONCHING A PRODUCT MASS

TECHNICAL FIELD

The present invention relates to a conching device and to a method for conching a product mass.

BACKGROUND

A conching device (also referred to as conche) is a device for processing a food product mass, in particular, in the chocolate production. Raw materials, such as, for example, cocoa mass, sugar, cocoa butter and/or milk powder, can be mixed by means of such a device and can be processed by the person of skill in the art in the known manner by exerting compression and/or shear forces. The latter is generally also referred to as conching and serves the purpose, inter alia, of discharging moisture and thus substances comprising unwanted properties, such as, for example, acetic acids or aldehydes.

The conching is an important process step, which can decisively determine the quality and the flavor of the end product. It is further a comparatively time-intensive process step, which is characterized by a correspondingly high energy demand.

It has been shown that a desired product quality cannot always be achieved with the known devices and methods, in particular when this is to take place in an efficient and energy-saving manner.

SUMMARY

The invention is thus based on the object of providing a conching device and a method for conching a product mass, which provide for a high product quality with improved efficiency.

To solve this problem, the invention proposes a conching device comprising the features specified in the patent claims, and a method comprising the features specified in the patent claims.

The conching device according to the invention comprises a container, which forms an accommodating space for a product mass. The container can be designed to be closed or open at least in part. In other words, the accommodating space can surround the product mass essentially completely. The accommodating space and/or container, however, can thereby also be at least locally interrupted and open by means of openings or supply channels.

The accommodating space can be defined by an inner wall of the container and/or an inner cross section of the container. The inner wall of the container and thus the accommodating space can further be heatable or coolable, for example via channels and/or pipes arranged in the container wall, through which a heated fluid is guided. The container can have an essentially identical shape as the accommodating space. In other words, a configuration of the outer cross section of the container can, at least across a large part of the axial length thereof, essentially correspond to the configuration of its inner cross section, whereby the latter can form the accommodating space.

The product mass can comprise at least one of the ingredients cocoa mass, sugar, cocoa butter, milk powder and fat. It can generally be a product mass, which is based on fat masses, for the production of luxury food, in particular for the production of chocolate.

According to the invention, the conching device further has a shaft, which is accommodated in the container at least in part and which is designed to rotate about its longitudinal axis. The shaft can further extend, at least in part, through the accommodating space. In one embodiment, the shaft extends essentially centrally through the container and/or accommodating space and advantageously in such a way that the container and/or accommodating space extends essentially in a rotationally symmetrical manner around the shaft. Deviations from the rotational symmetry can result due to local openings or supply channels in the container and/or the accommodating space.

As part of the present disclosure, the terms "axial" and "radial" can refer to the longitudinal axis of the shaft, unless otherwise specified or apparent. As part of the present disclosure, it can further generally be provided that the longitudinal axis of the shaft corresponds to a horizontal in the space, so that the radial extensions can refer to a vertical in the space. The terms "above" and "below" can relate to a position vertically above or vertically below the longitudinal axis of the shaft or a horizontal plane containing the longitudinal axis of the shaft. A position below the longitudinal axis of the shaft can, for example, relate to a position between the longitudinal axis of the shaft and a bottom area in the surroundings of the conching device.

The shaft can be designed essentially cylindrically and/or elongated. The shaft can further extend from one end to an opposite end of the container or accommodating space and optionally also beyond this, in order to be supported on both sides within the device.

The conching device further comprises at least one conching tool, which is coupled to the shaft for joint rotation, so that the conching tool, during a conching operation of the device, is moved in a first direction of circulation along a circulatory path. In other words, it is provided that the conching operation of the device is characterized by a predetermined direction of rotation of the shaft and thus a predetermined direction of circulation of the conching tool. The direction of circulation of the conching tool can in particular refer to a direction of circulation of the operative surface thereof, which will be described below. As will also be described below, a discharge operation of the device for discharging the product mass from the accommodating space can further be provided. The shaft can rotate counter to the direction of rotation of the conching operation during this discharge operation, and the conching tool can thus move in a second direction of circulation counter to the first direction of circulation along the circulatory path.

The circulatory path, along which the conching tool is moved, can run concentrically around and in particular circularly around the longitudinal axis of the shaft. The conching tool can further comprise a positioning section and an operative surface. The positioning section can extend essentially radially from the shaft and can arrange the operative surface with a desired orientation and/or a desired distance relative to the inner wall of the container. The operative surface can also extend at an angle to the positioning section. According to the invention, it is concretely provided that the operative surface of the conching tool faces the inner wall of the container. According to an alternative, the operative surface further extends at a relatively flat angle of, e.g., between 0° and 40° relative to the longitudinal axis of the shaft or also parallel thereto.

The operative surface can be that section of the conching tool, which performs the desired processing of the product mass during the conching operation and interacts with said product mass for this purpose. The operative surface can be designed, for example, to exert the compression and/or shear forces, which are required for the conching, on the product mass. The circulating path of the conching tool can accordingly be defined as the circulatory path of its operative surface in response to a rotation of the shaft.

The conching device can generally also comprise a plurality of conching tools, which are each coupled to the shaft and can rotate therewith in a predetermined manner. More than three conching tools, for example, can be provided and in particular at least four, at least five, or at least six conching tools. The conching tools can be arranged relative to one another in such a way in this context that the operative surfaces thereof are aligned without significant axial distances to one another along the shaft and/or axially overlap slightly. An essentially axially continuous cover of the inner wall of the container or, in other words, an axially quasi complete processing of the product mass along the shaft can be attained thereby.

The operative surface is further designed in such a way that a radial gap between the inner wall of the container and the operative surface, viewed counter to the first direction of circulation, decreases at least in part. The operative surface can thus be designed in such a way that the product mass is compressed and/or sheared at least in part, because the space between the operative surface and the inner wall of the container increasingly narrows in response to progressive movement in the first direction of circulation. More precisely, the product mass can initially reach across a radial gap, which is dimensioned to be comparatively large, between the operative surface and the inner wall of the container, whereby this gap, however, narrows in response to a continued rotation of the shaft in the first direction of circulation. This has the result that compression and/or shear forces can be exerted on the product mass. As a whole, a space between the operative surface and the inner wall of the container can thus be essentially wedge-shaped or funnel shaped, at least in part.

In other words, the operative surface can, during conching operation, comprise an inlet-side area, via which the product mass reaches into the space between the operative surface and the inner wall of the container. The operative surface can also comprise an outlet-side area, which, viewed counter to the first direction of circulation, is downstream from the inlet-side area. A radial distance (or, in other words, a radial gap) between the operative surface and the inner wall of the container can decrease, at least in part, between the inlet-side and the outlet-side area.

Again in other words, the operative surface can be designed in such a way that a radial gap between the inner wall of the container and the operative surface decreases at least temporarily in response to passing over a predetermined section of the stationary inner wall of the container, which can in particular be punctiform.

It goes without saying that the radial gap between the operative surface and the inner wall of the container can also be increased again in part. This can take place for example in an area, which, viewed counter to the first direction of circulation, is downstream from an operative surface section with a narrowing radial gap. In other words, the operative surface can be designed in such a way that, after compression and/or shearing of the product mass has taken place, the radial gap increases again, at least in part. This can in particular apply for an area of the operative surface on the outlet side during the conching operation.

The operative surface can generally comprise a curved area, which is located opposite the inner wall of the container, and in particular a convexly curved area. The operative surface can thus be shaped in such a way that it curves in the direction of the inner wall of the container or bulges in that direction. The operative surface can generally comprise depressions, inclined areas or guide surfaces, for attaining a desired product stream through the space between the operative surface and the inner wall of the container. It is also conceivable, however, that the operative surface has an essentially smooth and closed surface.

A further development of the invention provides that the operative surface has a depression, which extends along the circulatory path. The depression can be defined by edge areas of the operative surface, which are located opposite one another and which can run, for example, at an incline relative to the depression. In other words, the edge areas can form inclined side wall areas of the depression. The depression can define a guide area or, in other words, a guide channel, which extends along the circulating path. A product mass stream along the operative surface and along the circulatory path can be made possible thereby.

It can further be provided in this context that a width of the depression, which runs essentially transversely to the circulatory path, increases along the first direction of circulation. The width increase can take place gradually or also continuously by means of a variable or constant increase. The depression can thus generally be designed in a funnel-shaped or wedge-shaped manner, wherein it can narrow, viewed counter to the first direction of circulation. A guide area or guide channel, which is defined by the depression, can accordingly narrow, viewed counter to the first direction of circulation, which can promote the creation of the desired compression and/or shear forces.

The conching tool can further comprise a wiper, which is spaced apart, at least in part, from the operative surface, viewed along the circulatory path. The wiper can in particular be downstream from the operative surface, viewed counter to the first direction of circulation, and/or can overlap therewith only slightly along the circulatory path. For example as compared to the wiper, viewed in the first direction of circulation, the operative surface can assume a front position during the conching operation. In other words, the wiper can be closer to an outlet-side area of the operative surface than to an inlet-side area during the conching operation. The wiper can thus be designed to essentially interact with product mass, which has already been process by the operative surface within the current movement or rotation cycle, respectively, of the conching tool, during the conching operation.

The wiper can generally be designed to remove product mass, which adheres to the inner wall of the container, and/or to convey it in a desired direction. The wiper can be arranged at a distance of less than 3 mm, less than 2 mm, approx. 1 mm or less, to the inner wall of the container. Compared to the operative surface of the conching tool, the wiper can be designed with a significantly smaller surface, with which it is located counter to the inner wall of the container. This surface can in particular be essentially linear and can assume, for example, less than 25%, less than 10%, or less than 5% of the surface, which is defined by the operative surface of the conching tool.

It can further be provided in this connection that the wiper is arranged on the operative surface via a spacer, wherein the spacer is in particular designed in such a way that it provides for a radial passage of product mass. The spacer can extend essentially parallel to or along the circulatory path and can arrange the wiper along the circulatory path at a predetermined distance from the operative surface. The spacer can comprise at least one rod, at least one profile, or a different suitable structure.

The passage of the product mass can refer in particular to a product mass volume, which, viewed along the circulatory path, is arranged between the wiper and the operative surface. The swiper can provide for a passage of this product mass volume in the direction of the shaft. For this purpose, the spacer can comprise an opening or can generally not completely cover an area between the wiper and the operative surface.

Without limitation to the features described above in connection with the wiper, the wiper can also be elastically biased against the inner wall of the container. The biasing can generally take place elastically, in particular, in such a way that the wiper abuts against the inner wall of the container with a predetermined contact pressure. For this purpose, the wiper can be connected in an articulated manner to the operative surface and/or the conching tool and can be pushed in a resilient manner in the direction of the inner wall of the container. A small distance or also a contact between the wiper and the inner wall of the container can be attained in this way, whereby production tolerances of the container as a result of the biasing of the wiper are compensated.

The wiper and the operative surface can further extend along a joint section of the longitudinal axis of the shaft. In other words, the wiper and the operative surface can axially overlap, at least in part, or can also overlap essentially completely, can thus for example be designed with a corresponding axial length. One embodiment provides that, based on the axial length of the operative surface, the wiper protrudes axially beyond the operative surface by not more than 50% or by not more than 25% or by not more than 10%.

The wiper can further be oriented in such a way that it creates a product mass stream in the direction of a product outlet of the container, at least in response to a rotation of the conching tool in a second direction of circulation, which is counter to the first direction of circulation. The second direction of circulation can be a direction of circulation in the already mentioned discharge operation of the conching device. The wiper can be angled in a preferred way in this case, for example relative to the longitudinal axis of the shaft, and can create a preferred product mass stream in this way. The product outlet can in particular be arranged axially centrally on the container as well as on the underside thereof.

In the case of a plurality of conching tools, the wipers can be oriented individually, each in accordance with a position of the conching tools along the longitudinal axis of the shaft. They can each in particular be oriented in such a way that the above-described product mass stream can be created in the direction of the container center. Wipers, which are arranged, for example, on both sides of the product outlet or of the container center, can be oriented opposite and/or mirrored to one another, in order to be able to convey the product mass in the direction of the product outlet in each case. The term "container center" can generally refer to an axial central area of the container and/or of the accommodating space.

The wipers can thus take over different functions, depending on the direction of rotation of the shaft. During the discharge operation, they can support a quick and efficient discharging of the product mass, whereas product mass residues can be removed from the inner wall of the container in the conching operation.

The device can further comprise at least one deflection tool, which is coupled to the shaft for joint rotation, wherein the deflection tool, in particular by an optional cooperation with an adjacent inner wall of the container, is designed to create a product mass stream in the direction of a container center. The creation of the product mass stream in the direction of the container center can take place at least during the conching operation of the device. Compared to the operative surfaces of the conching tools, the deflection tool can have a significantly smaller surface, with which it is located opposite to the inner wall of the container (for example less than 25%, less than 10%, or less than 5% of the operative surface). This surface can further be essentially linear or elongated.

The deflection tool can be arranged on the shaft axially spaced apart from the conching tool. An operative surface of the deflection tool, which interacts with the product mass for deflecting, can, in turn, be radially spaced apart from the shaft via a positioning section of the deflection tool.

According to an embodiment, at least two deflection tools are provided, which are arranged at opposite axial ends of the accommodating space and/or of the shaft. All conching tools can thereby be arranged axially between the at least two deflection tools. The deflection tools can thus be designed to convey product mass from the axial end areas of the accommodating space back in the direction of the container center again, in order to create a preferred product mass stream within the accommodating space.

The deflection tool can attain the product mass stream essentially alone by means of an operative surface, which is oriented specifically for this purpose. According to one embodiment, the product mass stream is created, however, essentially in cooperation with the adjacent inner walls of the container and in particular with an adjacent axial end area of the accommodating space. The deflection tool can thereby be oriented in such a way that it initially pushes the product mass farther axially to the outside and thus away from the container center during the conching operation, whereupon the product mass is deflected from the inner walls of the container in the direction of the container center. A guiding of the product mass stream back in the direction of the container center can in particular take place in an area close to or above the longitudinal axis of the shaft.

The inventor has primarily recognized that a preferred product stream can be created by means of the deflection tool within the accommodating space, which can lead, inter alia, to a more intensive ventilation of the product mass.

A further development of the invention provides that a length of the accommodating space along the longitudinal axis of the shaft is larger than a radial extension of the accommodating space. Viewed in a section, which includes the longitudinal axis of the shaft (hereinafter also referred to as "longitudinal section"), the accommodating space can thus be designed with an essentially elongate shape, thus for example as an elongate ellipsis.

It can additionally or alternatively be provided that a radial extension of the accommodating space increases in each case from an axial end of the accommodating space to an area of the largest cross section of the accommodating space, wherein a product outlet and/or air outlet is arranged at or near the area of the largest cross section. The increase of the radial extension can take place essentially homogenously, variably or gradually. The largest cross section can be an area, which comprises a largest radial extension of the container, for example a largest diameter. In other words, it can be an area, which comprises the largest inner circumference of the accommodating space around the longitudinal axis of the shaft. The largest cross section can further form a symmetry plane of the accommodating space, wherein the accommodating space can be designed essentially mirror-symmetrically to this symmetry plane.

According to one alternative, the accommodating space is designed essentially elliptical, rhombic or as a double cone, viewed in the above-described longitudinal section, in the case of which the surface areas of the cones are placed adjacent to one another. A larger axis of the elliptical, rhombic or double cone shape can thereby in each case coincide with the longitudinal axis of the shaft. Additionally or alternatively, a smaller axis of the elliptical, rhombic or double cone shape can coincide with a radial extension to the longitudinal axis of the shaft and can in particular define the largest cross section of the accommodating space.

As part of the present disclosure, the container can generally be designed so as to be stationary, wherein the shaft in its interior is moved relative to the container by means of the conching tools attached thereto. The air outlet and/or the product outlet can thus generally also be arranged so as to be stationary within the conching device. The product outlet can generally be arranged, for example, on an underside of the container, which can face a bottom area in the surroundings of the conching device. The air outlet can likewise be arranged at a top side of the container, which faces away from the bottom area. In other words, the product outlet can be arranged below the longitudinal axis of the shaft and/or the air outlet can be arranged above the longitudinal axis of the shaft.

In one embodiment, the air outlet and the product outlet can essentially be located opposite one another or, in other words, can be positioned at inner wall areas of the container, which are located opposite one another. The product outlet and the air outlet can each provide an opening into the surroundings, which can also be opened and closed, for example via a valve device. The optional vicinity to the area of the largest cross section can suggest an axial distance of not more than 2 m, not more than 1 m, not more than 50 cm, or not more than 20 cm. It can in particular be provided that at least the product outlet is arranged immediately in the area of the largest cross section, and that the air outlet is only slightly axially spaced apart therefrom.

The inner walls of the container can define conveying or guide bevels, in order to guide the product mass in the direction of the product outlet. By arranging the air outlet in the area of the largest cross section, an intentionally large distance to a fill level of the product mass can be attained within the accommodating space. This can limit, for example, the discharge of dust into the surroundings during the conching.

The container can further comprise an air inlet, which is positioned in such a way that it can be arranged below a fill level of the product mass during the conching operation, and/or wherein the air inlet is positioned below the longitudinal axis of the shaft.

It can therefore be provided that the product mass is filled in maximally up to a predetermined fill level during the conching operation. The air inlet can be capable of being arranged below this predetermined fill level. This, in turn, can relate to an arranging on or close to an underside of the container, which faces a bottom area in the surroundings of the conching device.

As a whole, it is thus made possible that air can be supplied to the product mass below the fill level, but also additives containing fat, which can also be fed in via the air inlet. The inventor has recognized that a better mixing and thus a more comprehensive discharge of bitter substances from the product mass can be attained in this way.

The air inlet can generally be designed in such a way that the air supplied via it or also possible other additives can be supplied to the product mass essentially in the first direction of circulation. The air inlet can comprise or form a supply channel for this purpose. In other words, a supply of air or additives, which is essentially tangential to the first direction of circulation and/or to the circulatory path of the conching tool and/or to the adjacent inner wall of the container, into the product mass can be made possible via the air inlet. The term "essentially tangential" can refer to the fact that a vector component of the supply direction, which runs tangentially to the first direction of circulation, to the circulatory path or to the inner wall of the container, significantly exceeds a vector component, which runs transversely thereto, in particular by a factor of two, three or four.

Without limitation to the features described above in connection with the air inlet, it is further conceivable that the air inlet comprises an area and/or a throttle means, which is narrowed, at least in part. This area or this throttle means, respectively, can be arranged in the vicinity of a transition area between the air inlet and the accommodating space or also immediately in this transition area. A sheet metal, which locally narrows the cross section of the air inlet in the transition area to the accommodating space, is one example for a suitable throttle means. These alternatives generally make it possible that the flow speed of the air supply is systematically increased due to the cross sectional narrowing of the air inlet. For example a more effective drying of the product mass can be attained through this. Contaminations in the area of the air inlet can likewise be removed more effectively through this, in particular, in the above-discussed transition area.

The conching device can further comprise a compressed air unit, which is designed to supply compressed air to the container via the air inlet, in particular, in such a way that the compressed air supply essentially takes place in the first direction of circulation. The compressed air unit can comprise a nozzle, via which compressed air can be selectively blown into the air inlet. The nozzle can be positioned and/or dimensioned in such a way that a supply of further additives is additionally also possible through the air inlet, for example in the shape of fats or cleaning agents.

The term compressed air can also capture pressurized gases or gas mixtures, which differ from conventional ambient air. The supply in the first direction of circulation can refer to the above-described tangential supply. The supplied compressed air can have an air pressure of, for example, between 0.1 and 0.3 bar above the ambient pressure.

It can further be provided in this context that the conching device comprises a heating unit, which is designed to heat the air, which is to be supplied via the air inlet. This can in particular be a heating of the air prior to a supply or blow-in into the accommodating space, for example a heating within a compressed air reservoir.

The device can further comprise a weight sensing unit, which is designed to sense a weight of the container, including the product mass contained therein, during the operation of the device. This can be a weight of the product mass during the conching operation, for example to monitor a moisture and thus weight loss of the product mass. For this purpose, the weight sensing unit can comprise a so-called weighing cell.

The conching device can further comprise a control device, which is designed to control and/or to regulate the conching operation in accordance with sensing signals from the weight sensing unit. The control device can be set up, for example, to control at least the rotational speed of the shaft, the total duration of the conching operating, the time or the quantity of an air supply, as well as a temperature of the heatable container walls based on the sensed weight and in particular a sensed weight reduction.

The invention further relates to a method for conching a product mass, in particular by means of a device according to one of the preceding aspects, comprising the steps:

filling a product mass into an accommodating space, which is formed by a container, rotating a shaft, which is accommodated, at least in part, in the container, about its longitudinal axis, and moving a conching tool, which is coupled to the shaft for joint rotation, in a first direction of circulation along a circulatory path, wherein the conching tool comprises an operative surface facing the inner wall of the container, and wherein the operative surface is designed in such a way that a radial gap between the inner wall of the container and the operative surface decreases, at least in part, viewed counter to the first direction of circulation.

The method can thus provide for exerting the above-described compression and/or shear forces on the product mass by means of the rotation of the specifically designed operative surface of the conching tool in the first direction of circulation.

The method can thereby generally comprise any further step and any further feature for attaining all of the above-described advantages and interactions. For example, the method can further comprise a step of processing the product mass by means of the operative surfaces of the conching tool in the conching operation and/or a step of discharging the product mass by means of the above-described wiper of the conching tool during a discharge operation.

According to a further development, the method comprises the step of supplying air and/or an additive containing fat below a fill level of the product mass. This can relate to the above-described supply via the air inlet of the container and can, in turn, take place essentially tangentially to the first direction of circulation.

The method can likewise comprise the step of sensing a weight of the product mass contained in the container, in particular to determine the dehumidification level of the product mass. For this purpose, the total weight of the container and of the product mass contained therein can be sensed, whereupon the weight of the product mass contained therein and in particular the weight reduction thereof during the conching operation can be calculated by subtracting the known empty weight of the container. The method can further relate to a step of controlling the conching operation in accordance with the sensed weight, wherein the control can refer to the parameters discussed above by means of the control device.

The method can further comprise the step of reversing the direction of circulation of the conching tool, in order to convey the product mass from the container. This can take place as part of the above-discussed discharging operation. The reversal of the direction of circulation can relate to the moving of the conching tool in a second direction of circulation, which is counter to the first direction of circulation. A step of opening a product outlet can further be provided in this context, so that the product mass can escape via the product outlet. This can include an opening of a valve means of the product outlet.

Finally, the method can further comprise the step of supplying a predetermined portion of a quantity of an additive containing fat, which is to be supplied in total, only during the discharge of the product mass from the container. It can be attained thereby that the additive containing fat takes over a cleaning function in order to effectively remove residues of the product mass from the accommodating space of the container.

BRIEF DESCRIPTION OF THE DRAWINGS

Preferred embodiments of the invention will be described in more detail below on the basis of the enclosed schematic drawings, in which.

DETAILED DESCRIPTION

Figure 1:
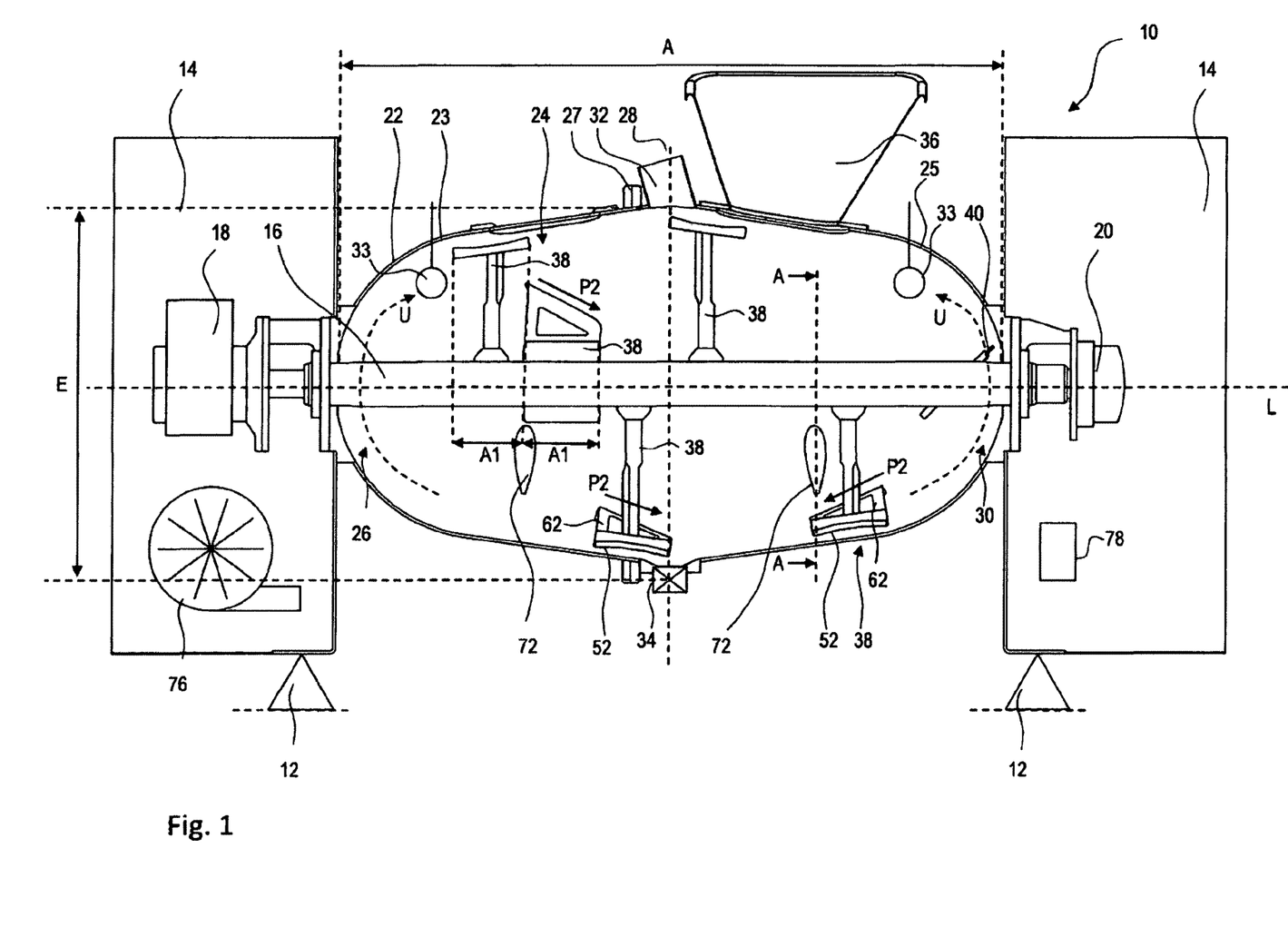
FIG. 1 shows a longitudinal sectional view of a conching device according to a first exemplary embodiment.

A conching device according to a first embodiment of the invention is shown in FIG. 1 and is generally identified with 10. The conching device 10 is supported on a horizontal bottom surface in its surroundings via supports 12. The conching device 10 further comprises two lateral frame arrangements 14, which are spaced apart from one another and which are each mounted via one of the support units 12. A cylindrical shaft 16, which is in each case rotatably mounted in the frame arrangements 14, extends between the frame arrangements 14. The shaft 16 runs along a longitudinal axis of the shaft L, along which the frame arrangements 14 are spaced apart from one another.

In the frame arrangement 14 on the left in FIG. 1, the shaft 16 is coupled to a drive unit 18. The drive unit 18 is designed to drive the shaft 16 for rotation about its longitudinal axis L. In the frame arrangement 14 on the right in FIG. 1, the shaft 16 is mounted in a bearing unit 20 so as to be rotatable about its longitudinal axis L.

The conching device 10 further comprises a container 22, which extends between the frame arrangements 14 along the longitudinal axis of the shaft L. The container 22 is coupled in a stationary manner to the frame arrangements 14 and is generally designed to be hollow. More precisely, the container 22 forms an accommodating space 24, which is defined by corresponding inner walls of the container 22. The container 22 and the accommodating space 24 are designed to be closed, with the exception of the openings, which will be described below.

It can be seen in FIG. 1 that the container 22 accommodates that section of the shaft 16, which extends between the frame arrangements 14 as well as between the drive unit 18 and the bearing unit 20. The shape of the container 22 further corresponds to the shape of the accommodating space 24, or, in other words, the outer cross section of the container 22 essentially corresponds to the inner cross section of the accommodating space 24. In the shown case, the container 22 and thus also the accommodating space 24 is essentially designed rotationally symmetrically to the longitudinal axis of the shaft L, wherein the longitudinal axis of the shat L is accommodated concentrically in the container 22 and extends through the latter. An axial length A of the accommodating space 24 formed by the container 22 further exceeds a maximum radial extension E of the accommodating space 24.

It can be seen concretely that the radial extension E of the accommodating space 24 increases from a first axial end area 26 close to the drive unit 18 to an area 28 of a largest cross section, or, in other words, a largest radial extension E. In the same sense, a radial extension E, starting at a second axial end area 30 of the accommodating space 24 close to the bearing unit 20, increases in the direction of the area 28 of the largest cross section. In other words, a radial extension E of the accommodating space 24, starting at the respective axial ends 26, 30 thereof, increases continuously towards the area 28 of the largest cross section. The accommodating space 24 is thus designed in an ellipsoidal manner, wherein the smaller axis of the ellipse corresponds to the radial extension E shown in FIG. 1. The shape of the accommodating space 24 can also be described as double cone comprising surface areas placed adjacent to one another, and tips, which are rounded in the end areas 26, 30. The tips can be designed, for example, so as to be rounded in a conical manner or, alternatively, also as flat ends. Finally, it is important to point out that the area 28 of the largest cross section forms a symmetry plane, which runs orthogonally to the longitudinal axis of the shaft L. The accommodating space 24 is designed essentially mirror-symmetrically to this symmetry plane.

It is important to note that the container 22 in FIG. 1 comprises two container halves 23, 25, which, however, are not assembled in the area 28 of the largest cross section. The container half 25 on the right in FIG. 1 is instead characterized by a larger axial length and extends, starting at the right axial end area 30, axially beyond the area 28 of the largest cross section. The container half 23 on the left in FIG. 1, in contrast, extends, starting at the left axial end area 26, in the direction of the other container half 25. The container halves 23, 25 are assembled and connected to one another along a flange 27, which circulates around the longitudinal axis of the shaft L.

This container setup per se, which comprises two container parts or halves 23, 25 of different axial length, which are assembled outside of the area 28 of the largest axial cross section, represents an independent aspect of the invention and is not limited to a combination with the further features of the present exemplary embodiment.

In the area 28 of the largest cross section, an air outlet 32 is arranged at a top side, which faces away from the bottom area as well as the support units 12. A product outlet 34 comprising a selectively openable and closable valve means is arranged at an opposite location and thus facing the bottom area as well as the support units 12. A filling funnel 36, via which a product mass, which is to be processed, or the raw materials thereof, respectively, can be filled into the accommodating space 24, can further be seen in FIG. 1.

The shaft 16, the longitudinal axis of the shaft L of which forms a horizontal in the space in the shown case, can be rotated about its longitudinal axis L relative to the stationary container 22 by means of the drive unit 18. On its section, which is accommodated in the container 22, the shaft has a plurality of conching and deflection tools 38, 40. The exact arrangement and number of these tools 38, 40 becomes clear from the perspective individual illustration of FIG. 2, in which the positions of the drive and bearing unit 18, 20 of the conching device 10 are also suggested.

Figure 2:
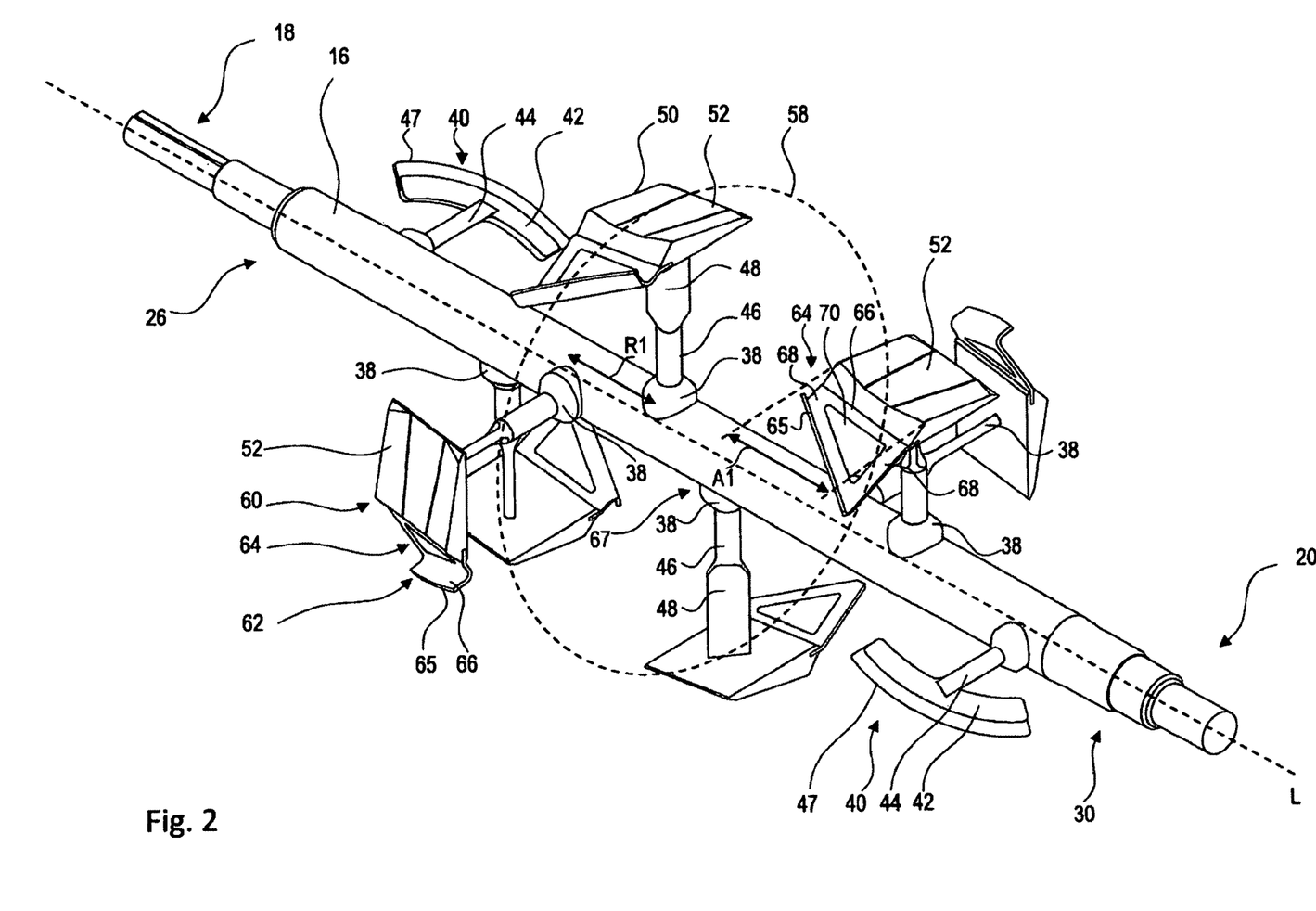
FIG. 2 shows a perspective individual part view of the shaft of the conching device from FIG. 1.

It can be seen in FIG. 2 that the shaft 16, at its axial ends close to the end areas 26, 30 of the accommodating space 24 as well as close to the drive or bearing unit 18, 20, respectively, in each case has a deflection tool 40. The deflection tool 40 comprises a curved deflection section 42, which is arranged via a positioning section 44 at a predetermined radial distance to the shaft 16. The deflection section 42 has a surface 47, which faces the inner wall of the container and which is essentially linear. As can be seen in FIG. 1, said surface is inclined relative to the longitudinal axis of the shaft L in a predetermined manner, so that it can create a desired product mass stream within the accommodating space 24. A total of six conching tools 38 are further arranged along the longitudinal axis of the shaft L as well as axially between the deflection tools 40 at even axial intervals R1 to one another. With the exception of their positioning along the longitudinal axis of the shaft L as well as in the direction of circulation of the shaft 16, the conching tools 38 are designed largely identical to one another. For example the orientation of wipers 62, which will be described below, of the respective conching tools 38, forms a further exception of this. For the sake of clarity, all of the features, which will be described below, are not always provided with separate reference numerals for all of the conching tools 38 in FIGS. 1 and 2.

The conching tools 38 each comprise a positioning section 46, which extends radially from the longitudinal axis of the shaft L in the direction of an opposite inner wall of the container. Close to the shaft 16, the positioning section 46 has an essentially round cross section, which transitions into a flattened area 48. To minimize flow resistances, an orientation of the flattened area 48 is selected individually along the longitudinal axis of the shaft L, depending on the position of the conching tool 38 (see FIG. 2).

An underside of an operating area 50 of the respective conching tool 38 is arranged at a radially outer end of the flattened area 48. The operating area 50 extends at an angle to the positioning section 46 as well as along an opposite inner wall of the container. The operating area 50 in each case further comprises an operative surface 52, which faces the inner wall of the container (see also FIG. 1).

Figure 4:
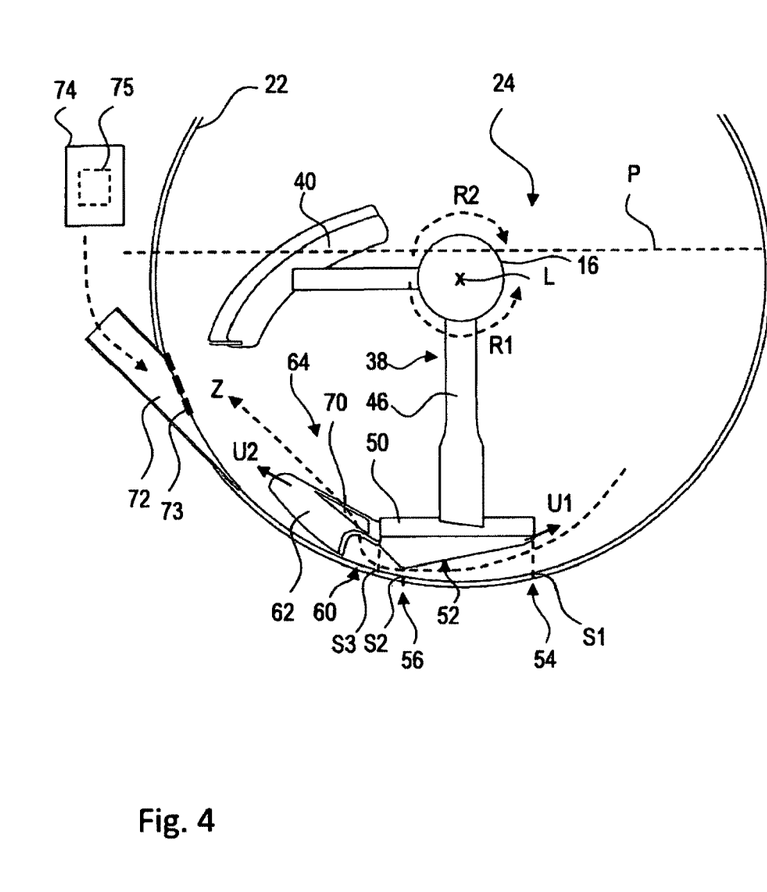
FIG. 4 shows a cross sectional view of the device from FIG. 1 for describing a conching operation of the device.

The structure and function of this operative surface 52 will initially be described below on the basis of FIG. 4. FIG. 4 shows a cross sectional illustration of the conching device 10 from FIG. 1, wherein a position of the sectional plane A-A is entered in FIG. 1. The container 22 is only illustrated schematically in FIG. 4 and with a cross section, which is open to the top.

The shaft 16 can initially be seen in FIG. 4, wherein the longitudinal axis of the shaft L is positioned perpendicularly to the sheet plane. A deflection tool 40 as well as a conching tool 38 is further shown. The positioning section 46, which extends radially from the shaft 16, as well as the operating area 50 of the conching tool 38 arranged thereon can further be seen in FIG. 4. Finally, it can be seen that the operative surface 52 faces the inner wall of the container, which defines the accommodating space 24.

The operative surface 52 has a first area 54 and a second area 56, which are spaced apart from one another along the inner circumference of the container 22. More precisely, the conching device 10 is designed to rotate the shaft 16 in a first direction of rotation R1 during a conching operation, and to thus also move the deflection and conching tools 38, 40, which are coupled thereto, in this direction. The operative surface 52 of each conching tool 38 is thereby moved relative to the inner wall of the container in a first direction of circulation U1.

The operating area 50 and in particular the operational surface 52 of each conching tool 38 is thereby in each case moved along a circular circulatory path 58 about the longitudinal axis of the shaft L along the inner wall of the container. The course of such a circulatory path 58 is shown schematically in FIG. 2, wherein this circulatory path 58 is assigned to the third conching tool 38 from the left in this figure. For the sake of completeness, it is important to mentioned that the two lower conching tools 38 in FIG. 1 move in the direction of the observer in response to a movement in the first direction of rotation and circulation R1, U1.

Coming back to FIG. 4, it can be seen that the first area 54 of the operative surface 52, viewed in the first direction of circulation U1, is upstream of the second area 56. In other words, the first area 54 forms an area of the operative surface 52, which is on the inlet side during the conching operation of the device 10, whereas the second area 56 forms an outlet-side area.

It can thus be seen in FIG. 4 that a radial gap S1, S2, or, in other words, a radial distance S1, S2 between the operative surface 52 and the inner wall of the container, viewed in the first direction of circulation U1, varies. More precisely, the size of this radial gap S1, S2 decreases from the first to the second area 54, 56, so that a space between the operative surface 52 and the inner wall of the container 22 increasingly narrows (see FIG. 4: S1>S2). It can likewise be seen in FIG. 4, however, that this gap S3 increases again in an operative surface area 60, wherein the operative surface area 60 is downstream from the second area 56, viewed counter to the first direction of circulation U1.

In summary, the operative surface 52 is thus designed in such a way that a radial gap S2, S3 between the operative surface 52 and the inner wall of the container decreases, at least in part, at least during the conching operation and in response to a movement in the first direction of circulation U1. It can thus be seen in FIG. 4 that the space defined by the operative surface 52 and the inner wall of the container is essentially wedge-shaped or funnel-shaped, and narrows and tapers, viewed counter to the first direction of circulation U1. In response to a continued rotation of the shaft 16 in the direction R1, the operative surface 52 in each case thus passes over consecutive inner circumferential sections of the container 22. Viewed from a stationary point on the inner wall of the container, an at least temporary decrease of the radial gap S1, S2 results thereby.

Figure 3:
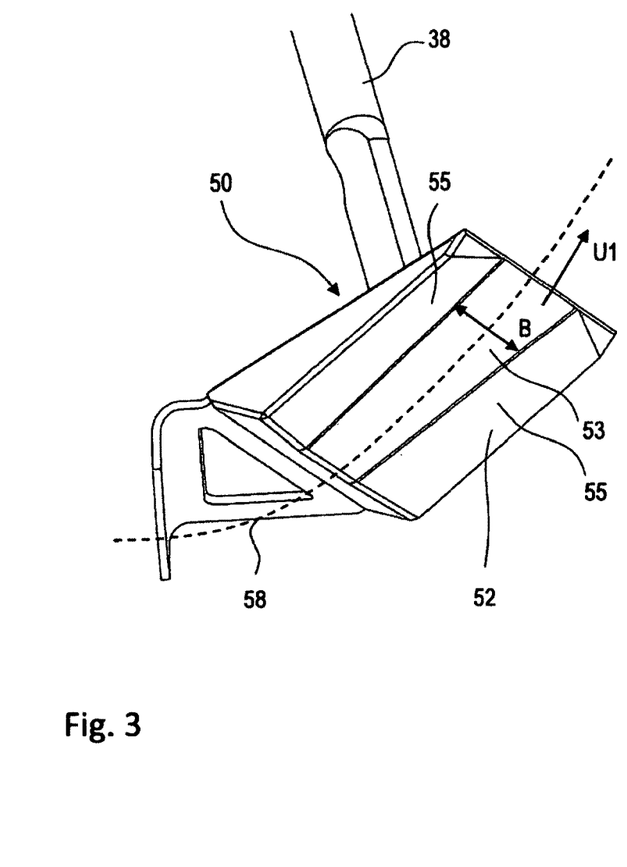
FIG. 3 shows a perspective individual part view of a conching tool of the conching device from FIG. 1.

Further details relating to the structure and function of the operative surface 52 of each conching tool 52 follow from FIG. 3. It can be seen there that the operative surface 52 comprises a depression 53, which is arranged axially centrically and which extends along the circulatory path 58 and thus in the direction of circulation U1 of the operative surface 52. The position of the longitudinal axis of the shaft relative to the operative surface 52 thereby follows from FIG. 1. It can further be seen in FIG. 3 that an axial width B of the depression 53 decreases, viewed counter to the direction of circulation U1. In other words, the depression 53 increasingly reduces, which is advantageous for the creation of compression and/or shear forces on the product mass, which is to be processed. The depression 53 is further surrounded by edge areas 55 of the operative surface 52, which also extend along the circulatory path 58 and which centrally accommodate and define the depression 53. The edge areas 55 are inclined relative to the plane of the depression 53.

With reference to FIG. 2, it can be seen below that the conching tools 38 further each comprise a wiper 62. Said wiper is coupled via a spacer 64 to the operating area 50 of a respective conching tool 38. More precisely, the wiper 62 comprises a linear surface 65 facing the inner wall of the container and a flat area 66 extending essentially radially to the inner wall of the container. Close to the widening area 60 of the operative surface 52, the spacer 64 is connected to said operative surface (see also FIG. 4).

In the case at hand, the spacer 64 comprises a first section 66, which extends axially along the operative surface 52, as well as two sections 68, which protrude therefrom in the direction of circulation (see FIG. 2, right half). As a whole, the spacer 64 extends at an essentially consistent distance to the opposite inner wall of the container. The sections 68, which run in the direction of circulation, are dimensioned differently, so that the wiper 62 and in particular the surface 65 thereof facing the inner wall of the container, are oriented in a predetermined manner. In the case of the two lower wipers 62 in FIG. 1, it can be seen, for example, that they are inclined opposite to each other as well as relative to the longitudinal axis of the shaft L.

In summary, the spacer 64 serves the purpose of coupling the wiper 62 to the operative surface 52 of a respective conching tool 38. Across its sections 68 shown in FIG. 2, the spacer 64 is further designed to arrange the wiper 62 at a predetermined orientation and at a predetermined distance relative to the operative surface 52 and to the inner wall of the container. Alternatively or additionally, the wiper 62 can also be elastically biased against the inner wall of the container, which can take place, for example, via an inclined resilient means between the wiper 62 and the operative surface 52.

As further becomes clear from FIG. 4, the wiper 62 is downstream from the operative surface 52, viewed counter to the first direction of circulation U1. The spacer 64 and the wiper 62 further define an opening 70, which allows for a radial passage of product mass. Finally, it can be seen in FIG. 1 that the wiper 62 and the operative surface 52 span an essentially identical axial section A1 of the longitudinal axis of the shaft L, or, in other words, axially overlap one another along the section A1.

Based on the above-described figures, a conching operation of the conching device 10 will be described below. First of all, the raw materials of the product mass, which is to be processed, are supplied into the container 22 via the filling funnel 36. This can take place manually or, in particular, in the case of larger systems, automatically, for example via separate pipe nozzles. In the case at hand, the raw materials comprise cocoa mass, sugar, cocoa butter, and milk powder, in order to obtain from this a product mass for the chocolate production. A product level P, up to which the product mass rises in the container 22, is suggested schematically in FIG. 4.

The shaft 16 is then driven in the first direction of rotation R1 by means of the drive unit 18, so that the conching tools 38 and in particular the operative surfaces 52 thereof are moved in the first direction of circulation U1 along their respective circulatory path 58. In response to a movement of the operative surfaces 52 below the longitudinal axis of the shaft L, a certain portion of the product mass reaches into the space between the operative surface 52 and an opposite area of the inner wall of the container. Based on the narrowing gap S1, S2, which is described on the basis of FIG. 4, between these elements, this portion of the product mass is subjected to an increasing compression pressure and/or shear forces (so-called conching). This leads to a desired mixing and stirring of the product mass and in particular to the successive discharge of bitter substances.

A possible path Z of a corresponding product mass portion is suggested schematically in FIG. 4. It can be seen that the path Z extends along the operative surface 52 and subsequently reaches into the area of the wiper 62. The wiper 62 is designed to release a portion of the product mass, which has already been processed by the operative surface 52, from the inner wall of the container. A product mass portion, which has already been processed, can likewise pass radially through the opening 70 between the spacer 64 and the wiper 62.

It can further be seen in FIG. 1 that the conching tools 38 are positioned in such a way along the longitudinal axis of the shaft that they each span immediately adjacent axial sections A1 of the shaft 16. Not all corresponding axial sections A1 are thereby entered in FIG. 1. In other words, the product mass can be axially processed virtually completely by the conching tools 38. It goes without saying on the basis of the product level P entered in FIG. 4 that the processing of the product mass only takes place when the operative surfaces 52 are located below the longitudinal axis of the shaft L. In FIG. 1, this relates in each case to conching tools 38, which are positioned below the longitudinal axis of the shaft L, whereas the conching tools 38 positioned above the longitudinal axis of the shaft L are arranged above the product level P and thus outside of the product mass.

It can further be seen in FIG. 1 that, in response to a rotation during the conching operation, the deflection tools 40, of which only one can be seen in FIG. 1, create a product mass stream U, which pushes the product mass to the respective adjacent axial end area 26, 30 of the accommodating space 24. This has the result that during the conching operation, the product mass is deflected continuously according to the arrow U across the axial end areas 26, 30 in the direction of the container center. Container center thereby refers to an axial center comprising the area 28 of the largest cross section. Concretely, the product mass is guided from an area below the longitudinal axis of the shaft along the inner walls of the container to approximately the height of the longitudinal axis of the shaft L or also beyond it, from where it flows to the container center.

The container 22 further comprises two wiper rollers 33, which are each arranged close to one of the axial end areas 26, 30. The wiper rollers 33 are designed to interact with the axially outer conching tools 38 and to wipe off product mass, which adheres thereto.

The product mass can thus be conched by continuing the rotation of the shaft 16 for several minutes or hours.

An air supply during the conching operation will be further described below. It can be seen in FIG. 1 that the container 22 in each case comprises at least one air inlet 72 on both sides of its axial center. According to further embodiments, however, at least two, at least four or at least six air inlets 72 can in each case also be provided on both sides of the axial center. The air inlet 72 is further arranged below the longitudinal axis of the shaft L. This is further clarified from FIG. 4, in which it can also be seen that the air inlet 72 is also positioned below the product level P. The air inlet 72 defines a supply channel, which is oriented in such a way that the air can be introduced into the accommodating space 24 and into the product mass accommodated therein, essentially tangentially to the adjoining inner wall of the container, the first direction of circulation U1, as well as an operative surface 52 moved along the air inlet 72.

The supplying of the air can take place via a compressed air unit 74, which is suggested schematically in FIG. 4 and which can heat the air to a predetermined temperature by means of a heating unit 75 prior to the supplying. Additives containing fat can also be supplied below the product level P through the air inlet 72.

A fan 76 of the compressed air unit 74, which is arranged within one of the lateral frame arrangements 14 of the conching device 10, is furthermore shown in FIG. 1. A connection channel between the fan 76 and the air inlets 72 is not illustrated, but can take place in the usual way via pipes, hoses or fluid channels.

An optional throttling means 73, which, in the shown case, is designed as a sheet metal component, is further suggested by means of a dashed line in FIG. 4. The throttling means 73 is arranged in the transition area between the air inlet 72 and the accommodating space 24 and narrows the flow cross section of the air inlet 72 there. A flow speed of the supplied compressed air is thus increased, whereby contaminations can be removed more easily from the transition area, and the product mass is dried more effectively.

In closing, it is important to point out that the conching device 10 can comprise a weight sensing unit in the form of a weighing cell 78, which is suggested schematically in FIG. 1. Said weighing cell can sense a weight of the container 22 together with the product mass filled therein in the known manner and can also sense therefrom a weight change of the product mass within the container 22 during the conching and/or discharge operation. Based on this, the progress of the conching or discharge can be monitored and the operation of the device 10 can be suitably adapted via a non-illustrated control unit.

A slight deviation further follows between FIGS. 1, 2 and 4 to the effect that, in the case of FIGS. 1 and 2, a transition area is designed in a base-shaped manner between the conching tools 38 and the shaft 16. In FIG. 2, a corresponding transition base 67 is provided with a separate reference numeral in an exemplary manner for one of the conching tools 38. For the sake of simplicity, such transition bases 67 are not illustrated in FIG. 4, but are likewise provided there. On principle, it is conceivable, however, to optionally also design the conching device 10 without such transition bases 67.

A discharge operation of the conching device 10 will be described below on the basis of FIGS. 1 and 4. In the discharge operation, the drive shaft 16 is rotated in a direction of rotation R2 counter to the first direction of rotation R1 (see FIG. 4). The conching tool 38 from FIG. 4 and in particular the operative surface 52 thereof is thus also rotated in a direction of circulation U2 counter to the first direction of circulation U1. This means that the product mass essentially interacts with the wiper 62 and is guided away from the operative surface 52 as far as possible by means of said wiper.

Concretely, it can be seen in FIG. 1 that the wipers 62 of the conching tools 38 are each oriented in such a way that, in response to a corresponding rotation of the shaft 16 in the direction of rotation R2, they create a product mass stream P2 in the direction of the container center or of the largest radial cross section 28, respectively. This has the result that the product mass can be discharged quickly from the container 22 via the product outlet 34, which is arranged axially in the center This is further supported by means of the above-described elliptical longitudinal section of the accommodating space 24. On the basis of this shape, the inner walls of the container close to the product outlet 34 define guide bevels, so that the product mass flows in the direction of the product outlet 34 under the impact of the gravity.

Figure 5:
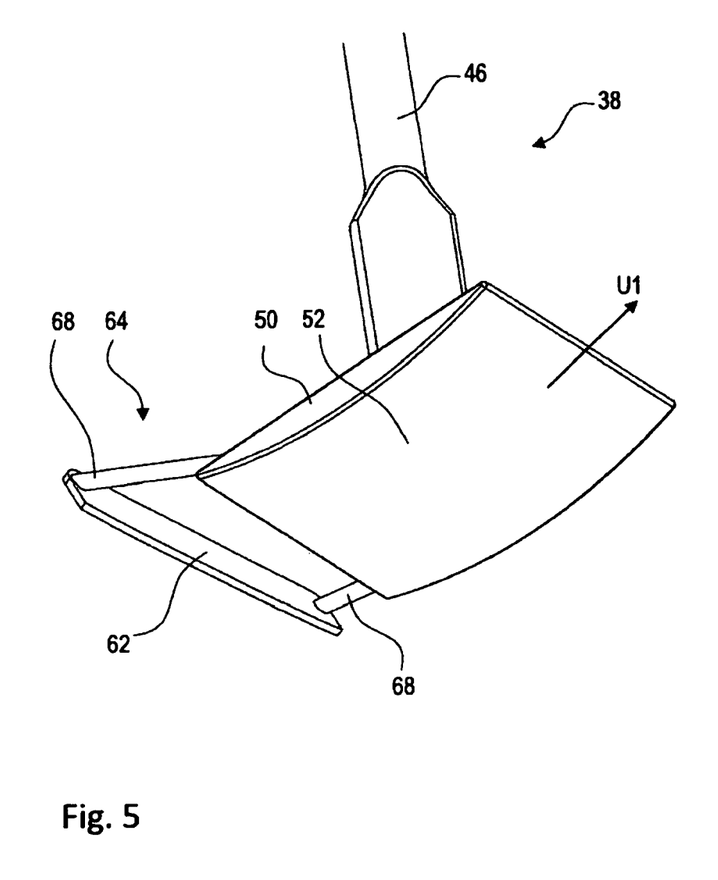
FIG. 5 shows a perspective individual part view of a conching tool according to a further embodiment.

A conching tool 38 according to an alternative embodiment of a conching device 10 according to the invention is shown in FIG. 5. Compared to the first embodiment, features, which have an identical effect or which are identical, are thereby identified with identical reference numerals. The conching tool 38, in turn, comprises a positioning section 46, at the radially outer end of which an operating area 50 of the conching tool 38 is arranged. Said operating area differs from the first embodiment in that the operative surface 52 is designed with an operative surface 52, which is flat and curved convexly in the direction of the opposite inner wall of the container. A radius of curvature of the operating surface 52 and/or an orientation of the operating area 50 relative to the inner wall is thereby selected in such a way that a radial gap narrowing occurs again during the conching operation, as described above on the basis of FIG. 4.

A wiper 62 can further be seen in FIG. 5, which is downstream from the operative surface 52, viewed counter to the first direction of circulation U1. This, in turn, takes place via a spacer 64, which comprises two webs 68, which extend essentially parallel to the inner wall of the container. The wiper 62, in turn, is oriented in such a way via the spacer 64 that the conveying effect described during the discharge operation in the direction of the product outlet 34 s attained.

Figure 6:
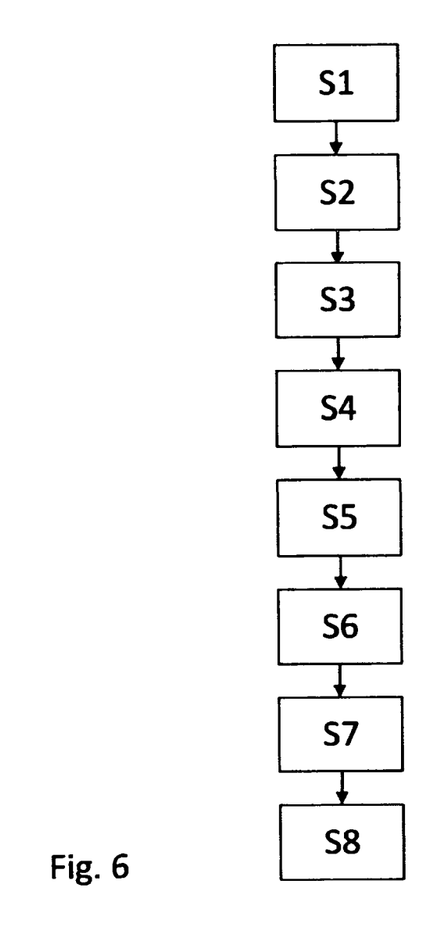
FIG. 6 shows a flowchart of a method according to the invention.

In conclusion, an example for the course of a method according to the invention will be described on the basis of FIG. 6. In a first step S1, the container 22 is filled with the raw materials, which form the product mass, here essentially cocoa mas, sugar, cocoa butter, and milk powder, via the filling funnel 36. This, in turn, can take place manually, or, in particular, in the case of larger systems, automatically, for example via separate pipe nozzles.

In a second step S2, the shaft 16 is then driven in the first direction of rotation R1, in order to mix the individual components to form a mixture, which is as homogenous as possible, and to loosen up this mixture. This step S2, which is also referred to as premixing, can comprise a driving of the shaft 16 for between three and ten minutes.

In step S3, a so-called dry conching takes place subsequently by continuing the shaft rotation. Hot air is thereby additionally blown in via the air inlets 72 from FIG. 4, so that said hot air reaches into the product mass below the product level P. This promotes the stirring and the discharge of bitter substances. Due to the essentially tangential supply of the air, which is additionally preheated to a certain temperature, the distribution of the air within the product mass is also improved. Depending on the desired product quality and the properties of the product mass, this step can last a significantly longer time period than the premixing according to step S2.

As part of step S3, the air supply can take place at predetermined time intervals. A discharge of air and moisture contained therein takes place parallel thereto via the air outlet 32 of the container 22 (see FIG. 1). This leads to an increasing weight loss of the product mass, which can be sensed by means of the weighing cell 78 from FIG. 1. The sensing of this weight reduction (or of the dehumidification level resulting therefrom, respectively), is shown in FIG. 3 as a separate step S4. This step, however, can also overlap in time with step S3 or can be performed completely parallel thereto. The conching operation of step S3 can further be continuously adapted to the sensed weight reduction. A typical weight loss, which is at hand after a completed dry conching, can comprise, for example, approx. 1% of the weight of the original product mass.

During the dry conching in step S3, the product mass can comprise a fat portion of maximally 23% and in particular of between 12% and 15%. This, however, can vary, depending on the product mass and the end product to be produced. When producing dark chocolate, the addition of milk powder, for example, can be forgone, so that the fat portion increases.

Initially, no further addition of liquid or fat takes place, up to and including steps S3 and S4, so that the product mass is processed only under the described supply of hot air. In contrast, the supply of an additive containing fat takes place in step S5, which, under continued rotation of the shaft 16 in the first direction of rotation R1, leads to a liquefying of the product mass. As described, this additive containing fat can be supplied via the tangential air inlets 72 below the product level P. In response to a supply via the air inlets 72, product adhesions, which are also present therein, can further be released and the air inlets 72 can thus be cleaned.

When the conching is concluded, the discharge operation of the conching device 10 can be begun in step S6. As described above, the shaft 16 is thereby driven in the opposite second direction of rotation R2, so that the wipers 62 convey the product mass in the direction of the axially central product outlet 34. The valve arrangement of the product outlet 34 is opened thereby. A predetermined portion of the total additive containing fat, which is to be supplied, can further be supplied only in this step or shortly before it, in order to avoid the adhering of product mass residues to the inner wall of the container and to attain an emptying of the container 22, which is as comprehensive as possible. It has been achieved by means of this method, for example, that less than 0.5%, and in particular less than 0.2%, or less than 0.1 percent of the total mass remain in the container 22.

The cleaning operation can then be begun in step S7. It can start automatically, when the above-described product emptying has taken place, which, in turn, can be determined via a sensing of a weight reduction of the product mass in the container 22. A cleaning of the container 22 can take place by means of water, fat or other suitable cleaning agents. A negative pressure within the container 22 can thereby also be created in step S8. A boiling point of the water is reduced thereby and the discharge of remaining product mass and/or of cleaning agent from the container 22 is furthermore promoted. The supply of cleaning agent can, in turn, take place via the tangential air inlets 72 and/or via cleaning heads, which are arranged close to the rollers 33 in FIG. 1.

A drying of the accommodating space 24 of the container 22 takes place subsequently in step S8. This can, in turn, take place by creating a negative pressure, a rotation of the shaft 16, a supply of hot air, and/or a heating of the container walls. In conclusion, it is important to note that in particular steps S2 and S4 are purely optional.

The invention claimed is:
1. A conching device, comprising:
   a container, which forms an accommodating space for a product mass,
   a shaft, which is accommodated in the container at least in part and which is designed to rotate about a longitudinal axis of the shaft, and
   at least one conching tool, which is coupled to the shaft for joint rotation, so that the conching tool, during a conching operation of the conching device, is moved in a first direction of circulation along a circulatory path,
   wherein the conching tool includes an operative surface facing an inner wall of the container,
   wherein the operative surface is designed in such a way that a radial gap between the inner wall of the container and the operative surface decreases, at least in part, viewed counter to the first direction of circulation,
   wherein the operative surface has a depression which extends along the circulatory path and is configured to guide a portion of the product mass within the radial gap.

2. The conching device according to claim 1,
  wherein a width of the depression, which runs transversely to the circulatory path, increases along the first direction of circulation, and thus the width of the depression decreases, viewed counter to the first direction of the circulation, such that the depression is configured to exert the compression and/or shear forces on the portion of the product mass within the radial gap.

3. The conching device according to claim 2, wherein the depression is surrounded by edge areas of the operative surface, and
  wherein the edge areas extend along the circulatory path and are inclined relative to a plane of the depression.

4. The conching device according to claim 1,
  wherein the conching tool includes a wiper, which is spaced apart, at least in part, from the operative surface, viewed along the circulatory path.

5. The conching device according to claim 4,
  wherein the wiper is arranged on the operative surface by means of a spacer, wherein the spacer is designed in such a way to provide for a radial passage of product mass.

6. The conching device according to claim 4,
  wherein the wiper and the operative surface extend along a joint section of the longitudinal axis of the shaft.

7. The conching device according to claim 4,
  wherein the wiper is oriented in such a way that the wiper creates a product mass stream in a direction of a product outlet of the container, at least in response to a rotation of the conching tool in a second direction of circulation, wherein the second direction of the circulation is counter to the first direction of circulation.

8. The conching device according to claim 1,
  wherein the conching device further includes at least one deflection tool, which is coupled to the shaft for joint rotation, and
  wherein the deflection tool is designed to create a product mass stream in a direction of a container center.

9. The conching device according to claim 8, wherein the deflection tool is designed to create the product mass stream via cooperation with an adjacent inner wall of the container.

10. The conching device according to claim 1,
  wherein the length of the accommodating space along the longitudinal axis of the shaft is larger than a radial extension of the accommodating space.

11. The conching device according to claim 1,
  wherein a radial extension of the accommodating space increases in each case from an axial end of the accommodating space to an area of the largest cross section of the accommodating space, wherein at least one of a product outlet and of an air outlet arranged in the vicinity of the area of the largest cross section.

12. The conching device according to claim 1,
  wherein the container includes an air inlet, which is positioned below a fill level of the product mass during the conching operation, and/or wherein the air inlet is positioned below the longitudinal axis of the shaft.

13. The conching device according to claim 12,
  wherein the conching device includes a compressed air unit, which is designed to supply compressed air to the container through the air inlet, such that the compressed air supply essentially takes place in the first direction of circulation.

14. The conching device according to claim 12,
  wherein the conching device further includes a heating unit, which is designed to heat the air, which is to be supplied via the air inlet.

15. The conching device according to claim 1,
  wherein the conching device includes a weight sensing unit, which is designed to sense a weight of the container, including the product mass contained therein, during the operation of the conching device.

16. A method for conching a product mass, comprising the steps:
  using a conching device which includes:
    a container, which forms an accommodating space for a product mass,
    a shaft, which is accommodated in the container at least in part, and
    at least one conching tool, which is coupled to the shaft for joint rotation,
  filling a product mass into the accommodating space, which is formed by the container,
  rotating the shaft about a longitudinal axis of the shaft, and
  moving the conching tool in a first direction of circulation along a circulatory path,
  wherein the conching tool includes an operative surface facing the inner wall of the container,
  wherein the operative surface is designed in such a way that a radial gap between the inner wall of the container and the operative surface decreases, at least in part, viewed counter to the first direction of circulation, and
  wherein the operative surface has a depression which extends along the circulatory path and is configured to guide a portion of the product mass within the radial gap.

17. The method according to claim 16, further comprising the step:
  supplying air and/or an additive containing fat below a fill level of the product mass.

18. The method according to claim 16, further comprising the step:
  sensing a weight of the product mass contained in the container.

19. The method according to claim 16, further comprising the step:
  reversing the direction of circulation of the conching tool, in order to convey the product mass from the container.

20. The method according to claim 16, further comprising the step:
  supplying a predetermined portion of a quantity of an additive containing fat, which is to be supplied in total, only during the discharge of the product mass from the container.

* * * * *